United States Patent [19]

O'Brien et al.

[11] Patent Number: 5,341,344
[45] Date of Patent: Aug. 23, 1994

[54] OBSTACLE-DETECTION SYSTEM

[75] Inventors: Stephen W. O'Brien, Arlington, Tex.; Leo C. Hayes, Jr., Lake Matthews, Calif.; Takaaki Nishyama, Ann Arbor, Mich.

[73] Assignee: Optical Detective Systems, Inc., Fort Worth, Tex.

[21] Appl. No.: 960,767

[22] Filed: Oct. 14, 1992

[51] Int. Cl.⁵ .............................. G01S 15/00
[52] U.S. Cl. ..................... 367/96; 367/909; 340/904
[58] Field of Search .............. 367/909, 116, 96; 340/904, 933, 943; 342/70, 72, 118

[56] References Cited

U.S. PATENT DOCUMENTS 4,148,028  4/1979  Fujiki ..................... 342/70
4,677,595  6/1987  Obayashi et al. ............ 367/99

Primary Examiner—Daniel T. Pihulic
Attorney, Agent, or Firm—Harold E. Meier

[57] ABSTRACT

A method and apparatus for detecting objects around a vehicle, comprising a plurality of microwave-transceiver sensors for transmitting microwave signals to reflect off objects around the vehicle. The reflected signals are received and passed to a control unit for comparing the received signal to a transmitted signal to determine whether a detected object constitutes a threat to the moving vehicle. An alarm means is connected to the control unit and activates upon the receipt of an alarm signal when the control unit determines a detected object constitutes a threat to the vehicle.

21 Claims, 4 Drawing Sheets

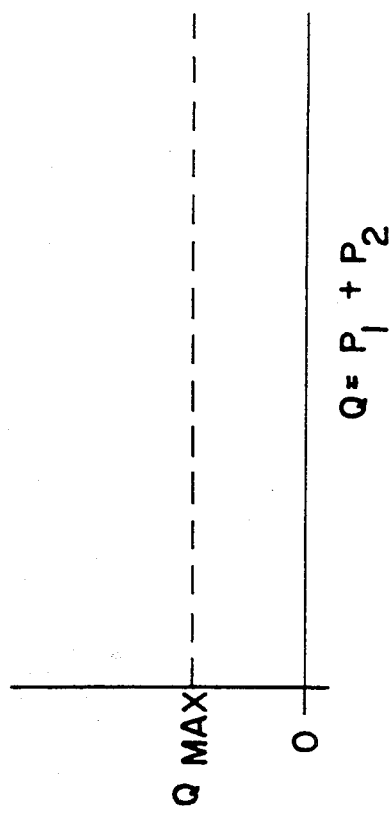
FIG. 3a
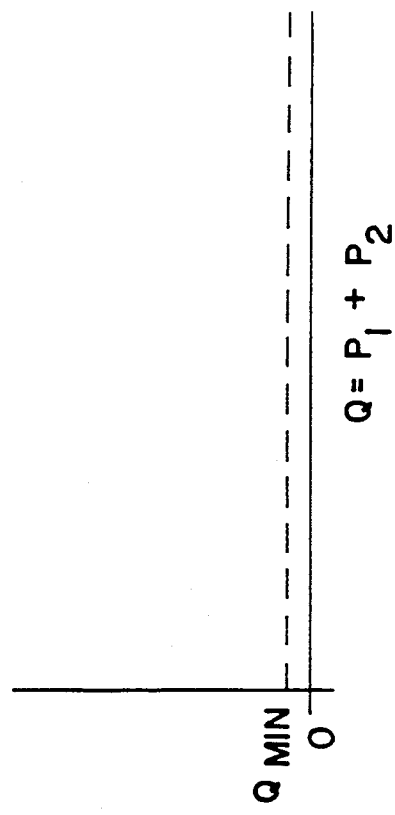
FIG. 3b
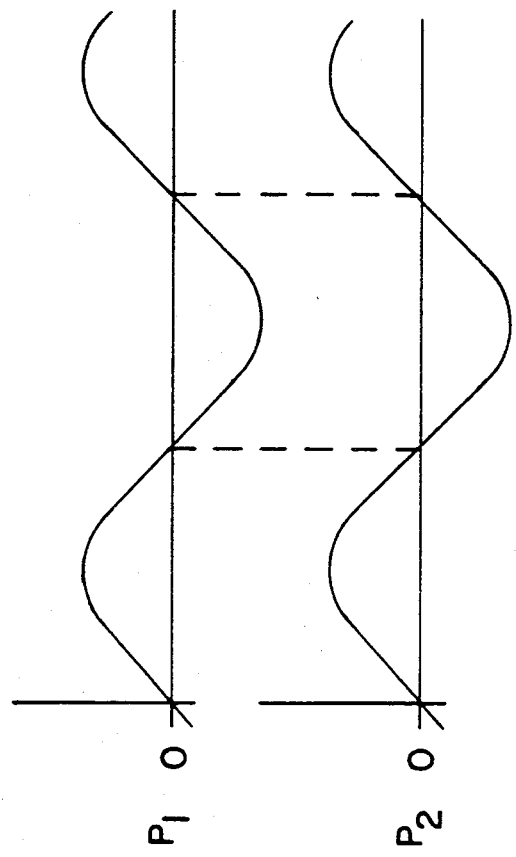
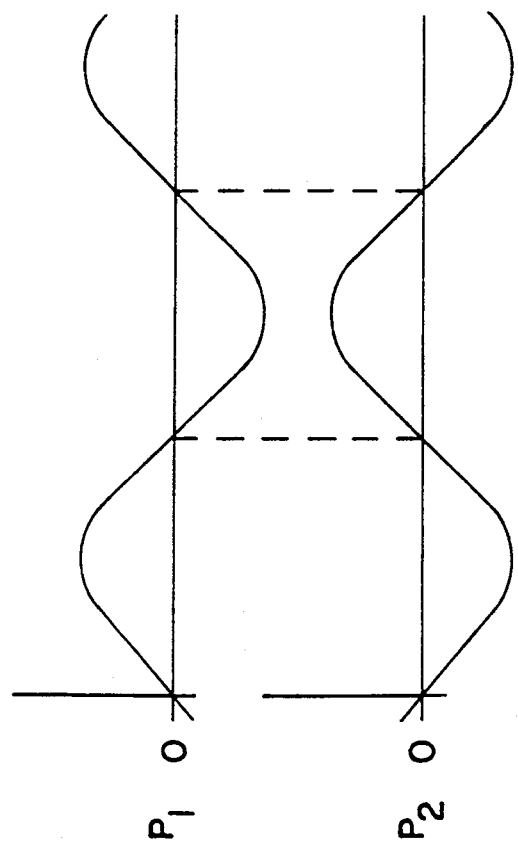

OBSTACLE-DETECTION SYSTEM

TECHNICAL FIELD

The present invention relates to a system for the detection of obstacles and, more particularly, to a vehicle obstacle detection system to determine tracking and distance of a detected obstacle.

BACKGROUND OF THE INVENTION

A major concern in the operation of vehicles is the avoidance of obstacles surrounding the vehicle. Many obstacles are not seen by the driver of the vehicle due to the fact the object is in a blind spot, the object is behind the vehicle or the driver is not paying attention. Present systems for dealing with vehicle blind spots or obstacle avoidance have not proved entirely satisfactory.

Prior systems have included the use of ultrasonic devices, microwave systems using Doppler shift principles and alert devices that warn of a backing vehicle. Ultrasonic devices send out sonic signals which bounce off of an obstacle and return to a receiving unit. Microwave systems utilizing Doppler shift principles rely on the phenomena that the returned signal from a target obstacle will have a frequency that is shifted from the original frequency based on whether the object is approaching or receding from the vehicle. The problems with ultrasonic and Doppler shift microwave systems include lack of accuracy, noise rejection, reliability, size constraints and high manufacturing costs. Alert devices warning of a backing vehicle are not sufficient to warn of stationary objects which, of course, cannot move, and many times individuals may ignore a backing alarm. Another problem with the backing alarm is it provides no information to the vehicle operator.

Thus, a need has arisen for a system allowing a vehicle operator to have a more accurate presence of obstacles surrounding a vehicle and overcoming presently existing technological limitations.

SUMMARY OF THE INVENTION

The present invention overcomes these and other problems by an obstacle-detection system utilizing voltage comparisons to track obstacle location and distance. The system uses microwave-transceiver sensors to electronically scan for obstacles in close proximity to the vehicle. Return signals received by the microwave-transceiver sensor are compared with transmitted signals in a comparator. The comparator determines the phase difference between the transmitted and received voltage signals. A small phase difference between the signals indicates an obstacle close to the vehicle and a large-phase difference indicates an object farther from the vehicle.

The results from the comparator are transmitted to a control processor for interpretation based upon the phase difference and a set of predetermined parameters. The results of this interpretation determine what type of alarm signal is sent to an alarm unit in the vehicle passenger compartment. The processor also keeps a running record of alarm signals sent to the alarm means, diagnosing system failures and detecting attempts to tamper with the system memory.

BRIEF DESCRIPTION OF THE DRAWINGS

For a more complete understanding of the present invention and the advantages thereof, reference is now made to the following detailed description taken in conjunction with the accompanying drawings in which:

FIGS. 3a and 3b are illustrations of the relationship between the transmitted and received signals and the output Q of the comparator.

DETAILED DESCRIPTION OF THE INVENTION

Figure 1:
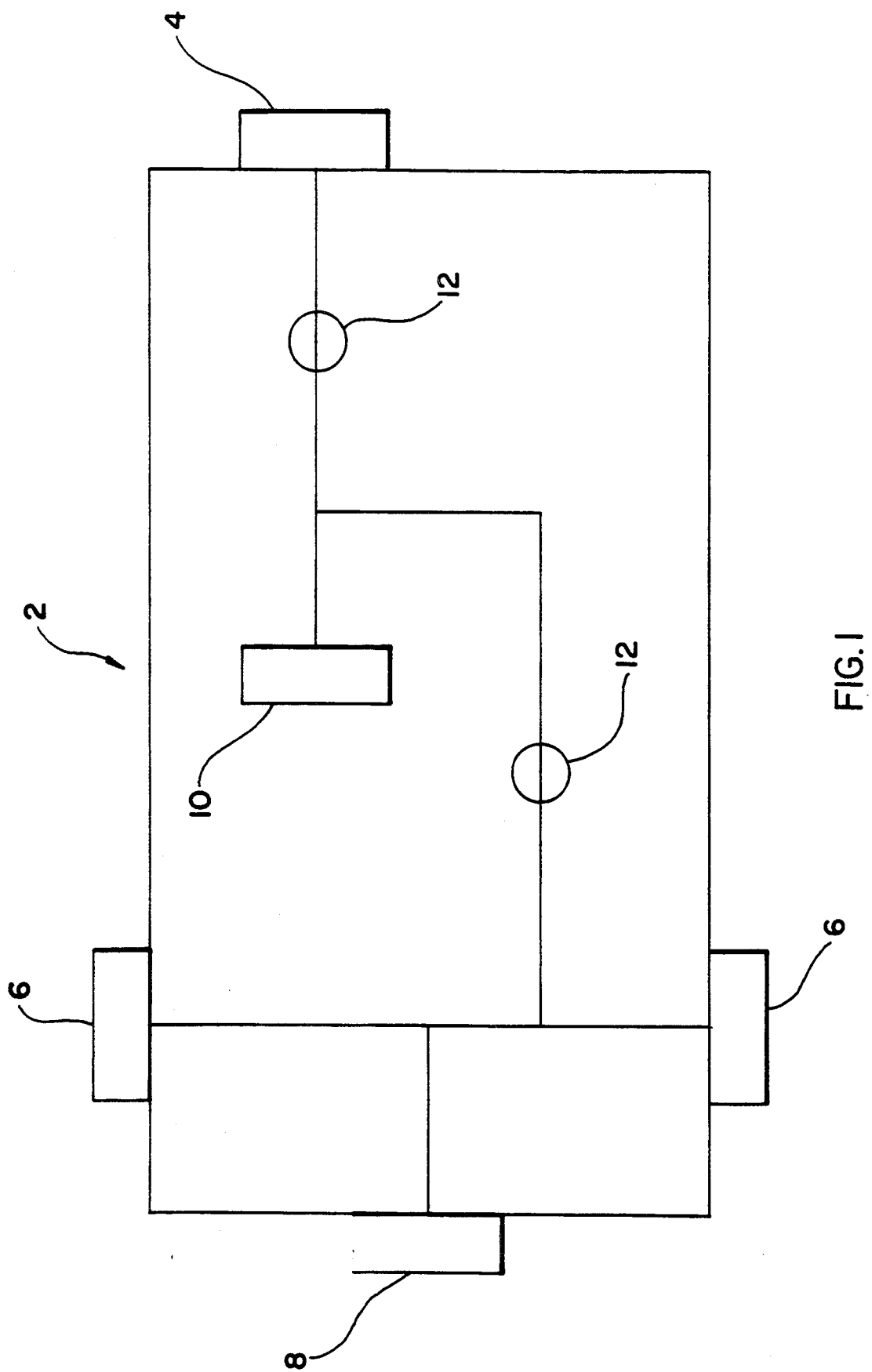
FIG. 1 is a diagram of a vehicle using the obstacle-detection system of the present invention.

Referring now to the drawings, and more particularly to FIG. 1 wherein there is shown a schematic illustration of a vehicle equipped with the obstacle-detection system. The vehicle 2 uses several microwave-transceiver sensors (4, 6, 8) for detecting obstacles in front, behind and on the rear quarters of the vehicle. The placement of the sensors in FIG. 1 is shown merely by way of illustration and not as a limitation. Multiple sensors may be added to compensate for additional blind spots or increased vehicle size on a multitude of vehicle types. Transmissions from the sensors (4, 6, 8) to a control unit 10 occur over a single transmission line 12 using a one-wire multiplexing-transceiver system. The multiplexing system utilizes SAE J1850 protocols or any other suitable protocol for communications between the microwave sensors (4, 6, 8) and the control unit 10 inside the vehicle 2.

The forward-sensing microwave-transceiver sensor 4 activates whenever the vehicle is in a forward gear. Additional sensors may be added to the front of the vehicle for purposes such as to curb detection. Sensors may also be placed on the upper areas of a taller vehicle to detect low-clearance threats to the vehicle. All rearward sensors (6 and 8) are activated whenever the vehicle is placed in reverse allowing the driver notification of obstacles while the vehicle is moving in a reverse direction. The left-rear quarter and right-rear sensors 6 are activated when the vehicle 2 changes lanes in traffic or makes a turn. The sensor 6 on the side of the lane change or turn is activated by the turn-signal indicator of the vehicle 2. Thus, the left-hand turn-signal indicator would activate the left-side sensor and the right-side turn indicator would activate the right-side sensor. The signals activating the individual sensors 6 in response to the direction of the vehicle are generated by a sensor control function 9 in the control processor 28 of the control unit 10.

Figure 2:
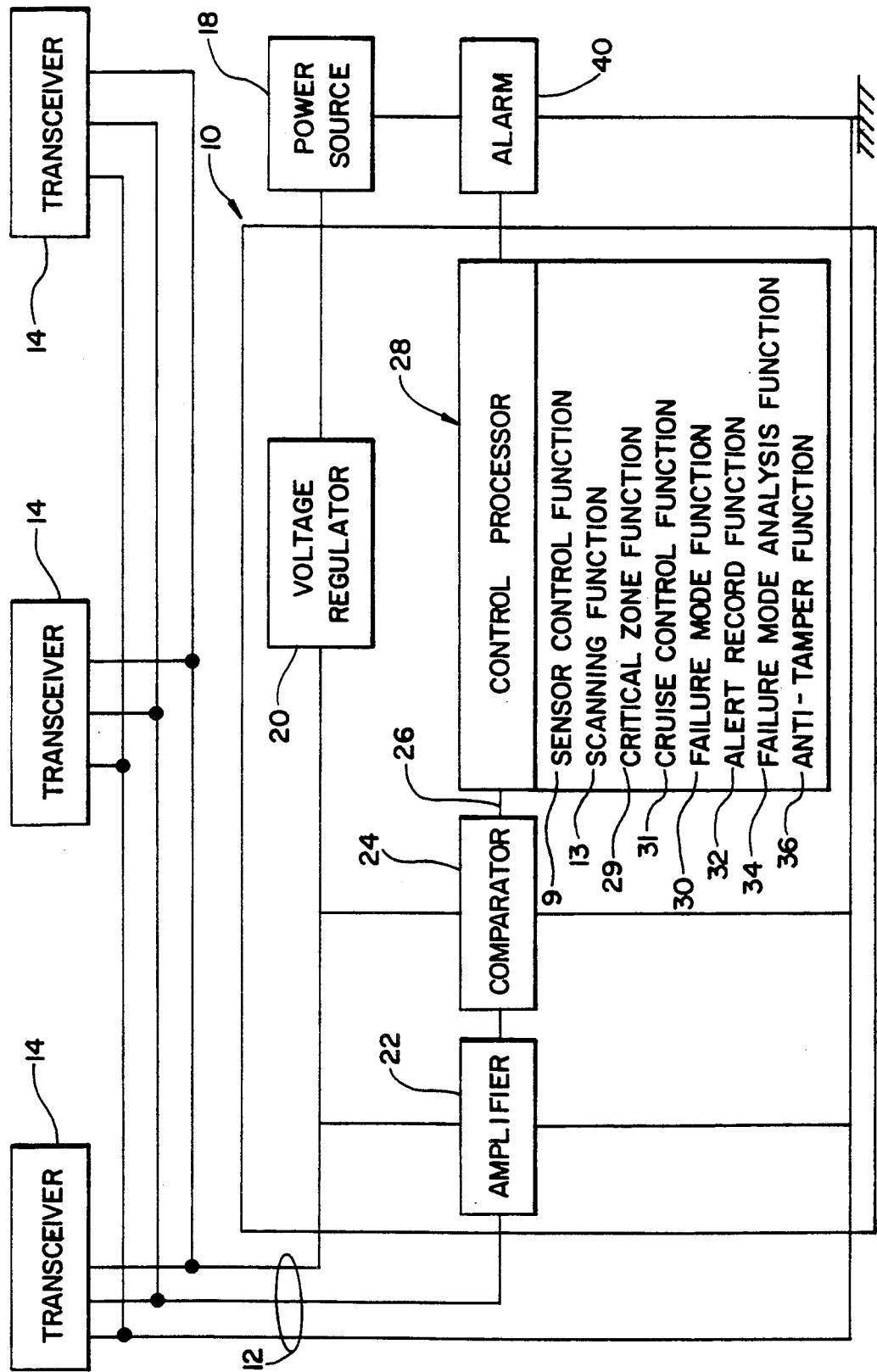
FIG. 2 is a block diagram illustrating the obstacle-detection system.

Referring now to FIG. 2, therein is shown a block diagram of an obstacle-detection system. As discussed earlier, the system utilizes a plurality of microwave-transceiver sensors 14 for detecting objects within the area of the vehicle 2. All of the microwave-transceiver sensors 14 transmit data to the control unit 10 over a single transmission line 12 using a multiplexing transceiver system.

The forward facing microwave-transceiver sensor uses a focused microwave beam electronically scanning in a raster pattern. The focusing system of the beam will utilize one or a combination of the following technologies. A focusing mechanism using magnetic flux coils aligned along the axis of a beam tube points the beam to a desired position. An array of focus lenses or parabolic dishes may also be used to focus the beam on a desired point. Whatever means is used it will be designed to focus a pin point beam to a predetermined maximum range. The height and width of the scanning pattern will vary according to the vehicle speed. As the vehicle speed increases, lateral and vertical scanning patterns will narrow in response to signals received from a scanning function 13 in the control processor 28.

The transmitted voltage signals originate at a power source 18 and applied through a voltage regulator 20 as a part of the control unit 10. This allows the transmitted signal to be controlled by the control unit 10. Reflected signals are received at a microwave-transceiver sensor 14 and transmitted to the control unit 10 via transmission line 12. The received signal is applied to an amplifier 22 where the signal is boosted before passing to the comparator 24.

The comparator 24 compares the phase of the received signal to the known phase of the transmitted signal. The comparator 24 adds the transmitted and received signals and generates an output Q over line 26 to a control processor 28. The output Q represents the distance of the detected object from the vehicle and will be more fully discussed later.

The output Q is analyzed by the control processor 28 using a critical zone function 29 to determine if a detected object is within the critical zone of the vehicle 2. The critical zone of the vehicle 2 is determined upon two parameters, (1) a width slightly greater than the overall width of the vehicle and (2) a range in front of the vehicle allowing the vehicle to safely stop before striking an obstacle. The safe stopping distance is based upon the speed of the vehicle and the gross vehicle weight.

If the critical zone function 29 determines the detected object is within the critical zone, the control processor 28 analyzes the following parameter and generates a collision-warning signal if the parameters are satisfied: (1) the accelerator pedal of the vehicle is depressed, (2) the brake pedal is not depressed, (3) the vehicle speed is greater than 10 miles per hour, (4) the vehicle is closing on the detected obstacle, and (5) the trajectory of the detected obstacle indicates imminent collision with the vehicle.

A warning alarm signal, not indicating a danger of collision but warning the driver of a potential hazard, is generated if a detected object is within the critical zone but its speed matches that of the vehicle and is moving in the same direction. A warning alarm signal is also generated when a detected obstacle is outside of the critical zone but the vehicle is closing on the obstacle or when a detected obstacle is passing through the critical zone but its trajectory indicates no immediate danger of collision. A cruise-control function 31 of the processor 28 is available for use in conjunction with the alarm signals to disengage the vehicle cruise control when there is a danger of collision.

The control processor 28 also runs a failure mode function 30 for recording the occurrence of predetermined failure modes of the obstacle-detection system. An alert-record function 32 of the control processor 28 maintains a continuous record of the previous forty alerts sent to a driver for any object detected by the system. The alert-record function 32 will record the identity of the sensor detecting the object and the position of the detected object in relation to the sensor. The control processor 28 further runs a failure-mode analysis function 34 for alerting the driver of failures within the system during activation or operation. Finally, an anti-tamper function 36 identifies whether any tampering or improper diagnostic procedures have been attempted on the control processor 28 or its associated memory.

Collision-warning signals and warning alarm signals from the control processor 28 are transmitted to the alarm unit 40 to indicate the detection of an obstacle threat to the vehicle and activate the alarms. The alarm unit 40 consists of visual and/or audio alarms for notifying the vehicle operator of a potential threat to the vehicle.

Referring now to FIGS. 3a and 3b, there are shown diagrams of the transmitted and received signals for obstacles at different distances from the vehicle 2. In FIG. 3a, the signal P1 represents the transmitted signal and P2 represents the received signal reflected from a detected obstacle. When an object is very close to the vehicle, the phase of the received signal P2 will be very close to the phase of the transmitted signal P1. Thus, as indicated in FIG. 3a, when the comparator adds P1 and P2 the value for Q will be highest for an object that is close to the vehicle. $Q_{max}$ occurs when the received and transmitted signals are in phase. As an object moves farther from the vehicle, the change in phase of the reflected signal P2 becomes greater.

Referring now to FIG. 3b, therein is illustrated the transmitted signal and receive signal from an object changing the phase of the transmitted signal by 180 degrees. This creates a value of Q very near to zero indicating an object farther away from the vehicle. Any object at a distance causing a phase difference greater than 180 degrees will not activate the alarm unit 40.

Figure 4:
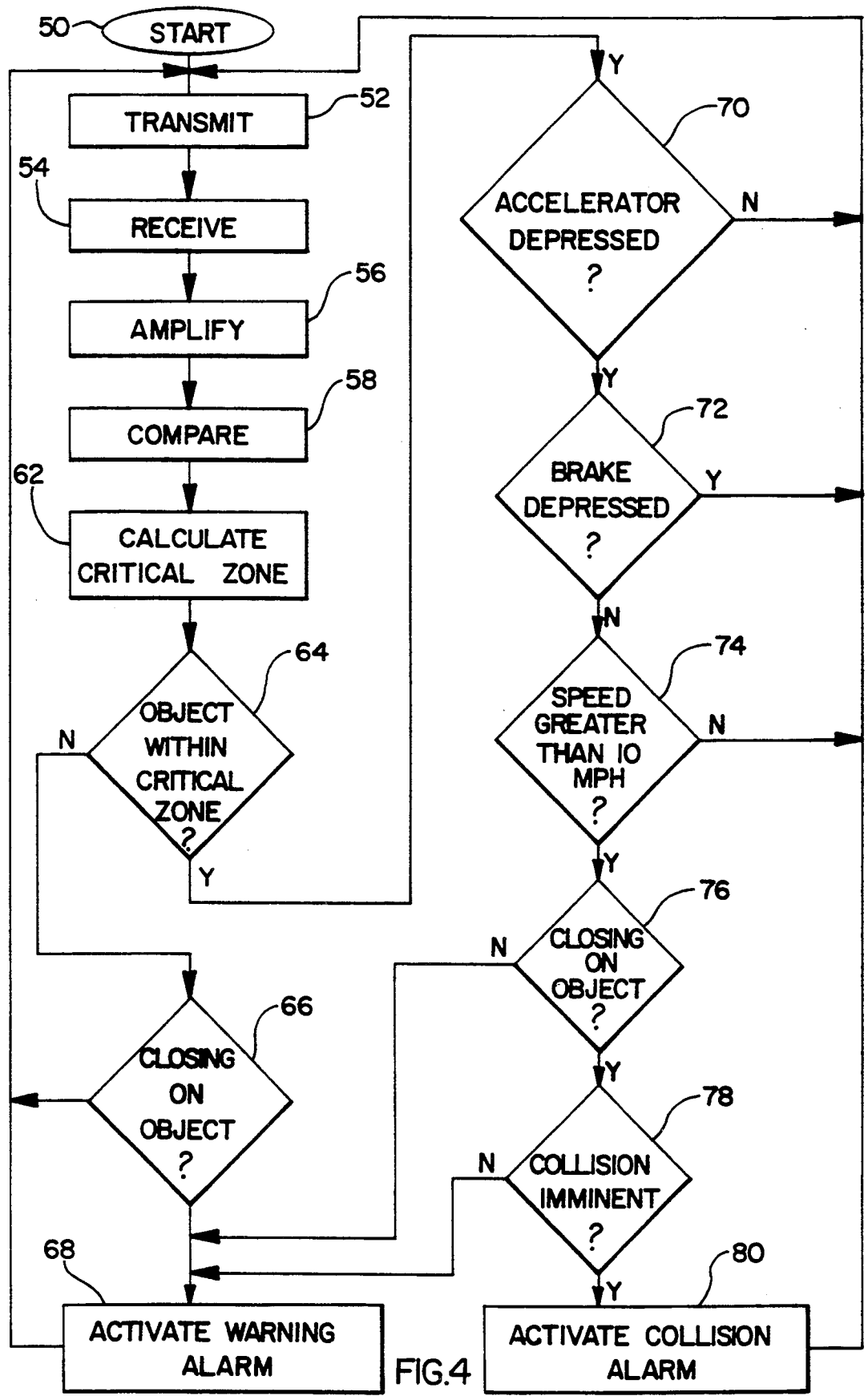
FIG. 4 is a flow diagram of the process for detecting an obstacle near the vehicle and activating the alarm unit.

Referring now to FIG. 4, therein is shown a flow diagram representing the operation of the obstacle-detection system. After the system is initiated at step 50, the microwave-transceiver sensor begins transmitting at step 52 microwave signals into the areas surrounding the vehicle. When a return signal is received at step 54 from a detected object, the signal is amplified at step 56 before comparison at step 58 to the transmitted signal to determine the location and distance of the detected object from the vehicle.

After the location and distance of the detected object are determined at step 58, the critical zone of the vehicle is calculated at step 62. If at inquiry step 64 the object is determined to be outside of the critical zone of the vehicle, a second inquiry is made at step 66 to determine if the vehicle is closing on the detected object. If the vehicle is closing on the object, the warning alarm is activated at step 68 to notify the vehicle operator that a possible hazard exists to the vehicle; if not, the system returns to step 52.

If step 64 determines that the detected object is located within the critical zone, an inquiry is made at step 70 to determine if the accelerator of the vehicle is depressed. If the accelerator is not depressed, the system returns to step 52. If the accelerator is depressed, step 72 determines if the brake is depressed. If the brake is depressed, the system will return to step 52 to continue transmitting signals; if not, a determination is made at step 74 as to whether the vehicle is traveling at a speed greater than 10 miles per hour. If the vehicle is traveling at less than 10 miles per hour, no alarm is generated and the system returns to step 52.

If the vehicle is traveling at greater than 10 miles per hour, a determination is made at step 76 to see if the vehicle and the obstacle are closing on each other. If the vehicle and the object are closing, inquiry step 78 determines the trajectory of the obstacle and decides if a collision between the vehicle and the obstacle is imminent. A collision imminent determination activates the collision alarm at step 80.

Should it be determined at step 76 that the vehicle and obstacle are not closing or that the trajectory of the obstacle indicates that a collision is not imminent at step 79, the warning alarm is activated to notify the driver of a possible threat. After either of the alarms are activated, control returns to step 52 and the system continues to scan the detected obstacle and for additional obstacles.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

We claim:

1. A system for detecting objects around a vehicle comprising:
   a plurality of microwave-transceiver sensors mounted to the vehicle for transmitting microwave signals having a first phase and receiving microwave signals reflected from objects around the vehicle and having a second phase;
   a phase comparator for comparing the transmitted microwave signal having the first phase with the received microwave signal having the second phase, said comparator generating an output signal in response to the phase comparison of the first phase and the second phase;
   a control processor responsive to the output signal of the comparator and generating an alarm signal, the control processor including means for altering a scanning pattern of a sensor in response to the speed of the vehicle; and
   alarm means for generating an alarm in response to the alarm signal received from the control processor.

2. The system of claim 1, wherein the control processor comprises:
   an amplifier for amplifying the signals received by the comparator.

3. The system of claim 1, including means for generating comprising:
   a power source; and
   means for regulating the output of the power source.

4. A system for detecting objects around a vehicle comprising:
   a plurality of microwave-transceiver sensors mounted to the vehicle for transmitting microwave signals having a first phase and receiving microwave signals reflected from objects around the vehicle and having a second phase;
   a phase comparator for comparing the transmitted microwave signal having the first phase with the received microwave signal having the second phase, said comparator generating an output signal in response to the phase comparison of the first phase and the second phase;
   a control processor responsive to the output signal of the comparator and generating an alarm signal, said control processor including means for recording predetermined failure modes of the system; and
   alarm means for generating an alarm in response to the alarm signal received from the control processor.

5. A system for detecting objects around a vehicle comprising:
   a plurality of microwave-transceiver sensors mounted to the vehicle for transmitting microwave signals having a first phase and receiving microwave signals reflected from objects around the vehicle and having a second phase;
   a phase comparator for comparing the transmitted microwave signal having the first phase with the received microwave signal having the second phase, said comparator generating an output signal in response to the phase comparison of the first phase and the second phase;
   a control processor responsive to the output signal of the comparator and generating an alarm signal, said control processor further including means for de-activating an individual sensor in response to control of the vehicle; and
   alarm means for generating an alarm in response to the alarm signal received from the control processor.

6. The system of claim 1, wherein the control processor further comprises means for determining a critical zone.

7. The system of claim 6, wherein the control processor further comprises means for determining a detected object in the critical zone.

8. The system of claim 1, where the control processor further comprises means for generating a collision-alarm signal in response to an analysis of a predetermined number of parameters.

9. The system of claim 1, wherein the control processor further comprises means for generating a warning alarm in response to the analysis of a set of predetermined parameters.

10. Method for detecting objects near a vehicle comprising the steps of:
    transmitting a microwave signal having a first phase;
    receiving a reflection microwave signal of the transmitted microwave signal, the reflection signal having a second phase;
    determining the phase difference between the transmitted microwave signal and the reflection microwave signal;
    calculating a critical zone based on the direction of movement of the vehicle;
    determining if a detected object lies within the critical zone based upon the comparison of the transmitted signal and the reflection signal;
    determining whether a number of predetermined criteria relating to position and/or direction and/or condition of the detected object and the vehicle are satisfied; and
    activating an alarm if the object lies within a critical zone and the predetermined criteria are satisfied.

11. The system of claim 4, wherein the control processor further comprises means for recording alert information sent to the alarm means.

12. The system of claim 4, wherein the control processor further comprises means for notifying of a system failure.

13. The system of claim 4, wherein the control processor further comprises means for identifying tampering with the system.

14. The system of claim 4, wherein the control processor further comprises means for disengaging a cruise control.

15. A microwave object detection system for use with a vehicle comprising:
a plurality of microwave-transceiver sensors for transmitting a microwave signal having a first phase and receiving a microwave signal having a second phase, said plurality of microwave-transceiver sensors detecting objects in the vicinity of the vehicle at least one of said microwave-receiver sensors includes means for focusing a microwave beam to electronically scan a predetermined pattern;
a phase comparator for comparing the transmitted microwave signal having the first phase with the received microwave signal having the second phase, said phase comparator generating an output signal in response to the phase comparison of the transmitted microwave signal and the received microwave signal;
a control processor responsive to the output signal of the comparator and generating an alarm signal, said control processor including means for individually activating the plurality of microwave transceiver sensors in response to operation of the vehicle; and
alarm means for generating an alarm in response to the alarm signal received from the control processor.

16. The system of claim 15, wherein the comparator further includes an amplifier for amplifying the received signal.

17. The system of claim 15, including a power source comprising a voltage regulator for adjusting the voltage of the transmitted signal.

18. The system of claim 15, wherein the control processor comprises a means for determining a critical zone.

19. The system of claim 18, wherein the control means comprises means for generating an alarm signal when an object enters the critical zone and a set of predetermined criteria are met.

20. The system of claim 18 wherein the control means comprises means for generating an alarm signal when a detected object is outside of the critical zone and meets a set of predetermined criteria.

21. A system for detecting objects around a vehicle comprising:
a plurality of microwave-transceiver sensors for transmitting and receiving microwave signals reflecting by an object, each sensor generating a scanning pattern for detecting objects around the vehicle;
control means for comparing the phase of a receive signal with the phase of a transmitted signal to determine a distance from the vehicle to an object reflecting the transmitted signal, said control means including a control processor for generating an output signal responsive to the comparison, said control processor including means for altering the scanning pattern of a sensor in response to the speed of the vehicle; and
alarm means responsive to the output signal from the control processor for notifying the driver of a detected object.

* * * * *